(12) United States Patent
Katsuki et al.

(10) Patent No.: US 11,878,764 B2
(45) Date of Patent: Jan. 23, 2024

(54) CONTROL DEVICE FOR HUMAN-POWERED VEHICLE AND CONTROL SYSTEM FOR HUMAN-POWERED VEHICLE

(71) Applicant: Shimano Inc., Osaka (JP)

(72) Inventors: Takuya Katsuki, Osaka (JP); Kiichiro Nagata, Osaka (JP); Daiki Iwabuchi, Osaka (JP); Toshihiko Takahashi, Osaka (JP); Kazuya Kuwayama, Osaka (JP); Atsushi Miyagawa, Osaka (JP)

(73) Assignee: Shimano Inc., Osaka (JP)

( * ) Notice: Subject to any disclaimer, the term of this patent is extended or adjusted under 35 U.S.C. 154(b) by 277 days.

(21) Appl. No.: 17/555,715

(22) Filed: Dec. 20, 2021

(65) Prior Publication Data
US 2022/0204124 A1  Jun. 30, 2022

(30) Foreign Application Priority Data
Dec. 28, 2020  (JP) ................................. 2020-219526

(51) Int. Cl.
   *B62L 3/02*  (2006.01)
   *B62L 1/00*  (2006.01)
   *B62M 6/50*  (2010.01)
   *B62M 6/55*  (2010.01)

(52) U.S. Cl.
   CPC .............. *B62L 3/023* (2013.01); *B62L 1/005* (2013.01); *B62M 6/50* (2013.01); *B62M 6/55* (2013.01)

(58) Field of Classification Search
   CPC ...................................................... B62M 6/45
   See application file for complete search history.

(56) References Cited

U.S. PATENT DOCUMENTS

| | | | |
|---|---|---|---|
| 2008/0111342 A1* | 5/2008 | Niekerk ................. | B60T 8/171 188/26 |
| 2010/0252345 A1* | 10/2010 | Hoshino ................. | B60L 50/53 303/152 |
| 2016/0318575 A1 | 11/2016 | Shimoda et al. | |
| 2019/0118785 A1* | 4/2019 | Takayama .............. | B60T 8/171 |
| 2019/0127018 A1* | 5/2019 | Nishino .................... | B62L 1/02 |
| 2021/0009231 A1* | 1/2021 | Tsai ........................ | B62L 1/005 |
| 2021/0078660 A1* | 3/2021 | Honda .................... | B62J 45/412 |
| 2022/0204124 A1* | 6/2022 | Katsuki ................... | B62J 45/41 |

FOREIGN PATENT DOCUMENTS

JP   2016-203932 A   12/2016

* cited by examiner

*Primary Examiner* — Phutthiwat Wongwian
*Assistant Examiner* — Arnold Castro
(74) *Attorney, Agent, or Firm* — Global IP Counselors, LLP

(57) ABSTRACT

A control device is provided for controlling a human-powered vehicle. The control device includes an electronic controller. The human-powered vehicle includes a drive unit, a brake device, and a brake control device. The drive unit is provided with an electric motor that assists in propulsion of the human-powered vehicle. The brake device generates brake force. The brake control device controls the brake force with an electric actuator differing from the electric motor. The electronic controller is configured to control the electric motor in accordance with an actuation state of the brake control device.

21 Claims, 11 Drawing Sheets

CONTROL DEVICE FOR HUMAN-POWERED VEHICLE AND CONTROL SYSTEM FOR HUMAN-POWERED VEHICLE

CROSS-REFERENCE TO RELATED APPLICATIONS

This application claims priority to Japanese Patent Application No. 2020-219526, filed on Dec. 28, 2020. The entire disclosure of Japanese Patent Application No. 2020-219526 is hereby incorporated herein by reference.

BACKGROUND

Technical Field

The present disclosure generally relates to a control device for a human-powered vehicle and a control system for a human-powered vehicle.

Background Information

Japanese Laid-Open Patent Publication No. 2016-203932 (Patent Document 1) discloses an example of a brake control device for a human-powered vehicle. A human-powered vehicle control device of Patent Document 1 controls a brake with a motor that assists in propulsion of the human-powered vehicle.

SUMMARY

An objective of the present disclosure is to provide a human-powered vehicle control device and a human-powered vehicle control system that optimally control a motor that assists in propulsion of a human-powered vehicle.

In accordance with a first aspect of the present disclosure, a control device in is provided for a human-powered vehicle. The human-powered vehicle includes a drive unit, a brake device, and a brake control device. The drive unit is provided with an electric motor that assists in propulsion of the human-powered vehicle. The brake device generates brake force. The brake control device controls the brake force with an electric actuator differing from the electric motor. The control device comprises an electronic controller configured to control the electric motor in accordance with an actuation state of the brake control device. The control device according to the first aspect optimally controls the motor that assists in propulsion of the human-powered vehicle in accordance with the actuation state of the brake control device.

In accordance with a second aspect of the present disclosure, the control device according to the first aspect is configured so that the electronic controller is configured to stop driving the electric motor in accordance with the actuation state of the brake control device. The control device according to the second aspect stops driving the electric motor in accordance with the actuation state of the brake control device.

In accordance with a third aspect of the present disclosure, the control device according to the first aspect is configured so that the electronic controller is configured to change a control state of the electric motor from a first state to a second state in accordance with the actuation state of the brake control device. The second state is less in an assist level of the electric motor than the first state. The control device according to the third aspect decreases the assist level of the electric motor in accordance with the actuation state of the brake control device.

In accordance with a fourth aspect of the present disclosure, the control device according to the third aspect is configured so that the electronic controller is configured to change the control state of the electric motor from the first state to the second state in a case where the brake control device is actuated. The control device according to the fourth aspect decreases the assist level of the electric motor in a case where the brake control device is actuated.

In accordance with a fifth aspect of the present disclosure, the control device according to the third aspect is configured so that the electronic controller is configured to change the control state of the electric motor from the first control state to the second control state in a case where the brake control device is actuated before a first period elapses from a point of time at which the brake control device was de-actuated. The control device according to the fifth aspect decreases the assist level of the electric motor in a case where the brake control device is actuated before the first period elapses from a point of time at which the brake control device was de-actuated.

In accordance with a sixth aspect of the present disclosure, the control device according to any one of the third to fifth aspects is configured so that the electronic controller is configured to change the control state of the electric motor from the second state to the first state upon a first condition being satisfied in a case where the control state of the electric motor is the second state. The control device according to the sixth aspect changes the control state of the motor from the second state to the first state in a case where the first condition is satisfied.

In accordance with a seventh aspect of the present disclosure, the control device according to the first aspect is configured so that the electronic controller is configured to change a control state of the electric motor from a third state to a fourth state in accordance with the actuation state of the brake control device. The fourth state is greater in an assist level of the electric motor than the third state. The control device according to the seventh aspect increases the assist level of the electric motor in accordance with the actuation state of the brake control device.

In accordance with an eighth aspect of the present disclosure, the control device according to the seventh aspect is configured so that the electronic controller is configured to change the control state of the electric motor from the third state to the fourth state in a case where the brake control device is changed from an actuated state to a de-actuated state and a vehicle speed of the human-powered vehicle is greater than or equal to a predetermined vehicle speed. The control device according to the eighth aspect increases the assist level in a case where the brake control device is changed from the actuated state to the de-actuated state and the vehicle speed of the human-powered vehicle is greater than or equal to the predetermined vehicle speed. This limits increases in the load on the rider in a case where the brake control device is changed from the actuated state to the de-actuated state.

In accordance with a ninth aspect of the present disclosure, the control device according to the first aspect is configured so that the electronic controller is configured to drive the electric motor in a case where a predetermined condition related to a traveling state of the human-powered vehicle is satisfied, and is configured not to drive the electric motor in a case where the brake control device is actuated even in a case where the predetermined condition is satisfied. The control device according to the ninth aspect does not drive the electric motor in a case where the brake control device is actuated even if the predetermined condition is satisfied. Thus, the traveling state of the human-powered vehicle will not be affected by the motor in a case where the brake control device is actuated.

In accordance with a tenth aspect of the present disclosure, the control device according to the eighth aspect is configured so that the electronic controller is configured to change the control state of the electric motor from the third state to the fourth state in a case where the brake control device is changed from an actuated state to a de-actuated state and the vehicle speed of the human-powered vehicle is greater than or equal to the predetermined vehicle speed, and then, the electronic controller is configured to change the control state of the electric motor from the fourth state to the third state in a case where a second condition is satisfied. The second condition is satisfied in at least one of a case where a second period elapses and a case where a traveling state of the human-powered vehicle becomes a predetermined state. The control device according to the tenth aspect decreases the assist level in at least one of a case where the second period elapses and a case where the traveling state of the human-powered vehicle becomes the predetermined state.

A control system in accordance with an eleventh aspect of the present disclosure is for a human-powered vehicle. The control system comprises the control device according to any one of the first to tenth aspects, the drive unit, and the brake control device. The control system according to the eleventh aspect including the drive unit and the brake control device controls the motor in a preferred manner.

In accordance with a twelfth aspect of the present disclosure, the control system according to the eleventh aspect is configured so that the brake device is configured to use pressure of a fluid to generate the brake force. Further, the brake control device is configured to drive a valve provided in a flow passage of the fluid with the electric actuator. The control system according to the twelfth aspect actuates the brake control device by driving the valve.

In accordance with a thirteenth aspect of the present disclosure, the control system according to the eleventh aspect is configured so that the brake device is configured to use pressure of a fluid to generate the brake force. Further, the brake control device is configured to drive a pump provided in a flow passage of the fluid with the electric actuator. The control system according to the thirteenth aspect actuates the brake control device by driving the pump.

In accordance with a fourteenth aspect of the present disclosure, the control system according to the eleventh or twelfth aspect is configured so that the brake control device is integrated with the brake device. With the control system according to the fourteenth aspect, the brake control device is integrated with the brake device. This decreases the number of parts.

In accordance with a fifteenth aspect of the present disclosure, the control system according to any one of the eleventh to fourteenth aspects is configured so that the human-powered vehicle includes a first wheel and a second wheel. Further, the electric actuator includes a first actuator corresponding to the first wheel and a second actuator corresponding to the second wheel. The control system according to the fifteenth aspect brakes each of the first wheel and the second wheel in a preferred manner.

In accordance with a sixteenth aspect of the present disclosure, the control system according to any one of the eleventh to fourteenth aspects is configured so that the electronic controller includes a first controller that controls the electric motor and a second controller that controls the electric actuator. The first controller is provided at the drive unit. The second controller is provided at the brake control device. The human-powered vehicle includes a first wheel and a second wheel. The electric actuator includes a first actuator corresponding to the first wheel and a second actuator corresponding to the second wheel. The second controller includes a third controller configured to control the first actuator and a fourth controller is configured to control the second actuator. The control system according to the sixteenth aspect optimally controls the first actuator and the second actuator with the third controller and the fourth controller, respectively.

In accordance with a seventeenth aspect of the present disclosure, the control system according to any one of the eleventh to fifteenth aspects is configured so that the electronic controller includes a first controller that controls the electric motor and a second controller configured to control the electric actuator. The first controller is provided at the drive unit. The second controller is provided at the brake control device. With the control system according to the seventeenth aspect, the first controller that controls the motor is provided at the drive unit and the second controller that controls the brake control device is provided at the brake control device. This simplifies the configuration of the control system.

In accordance with an eighteenth aspect of the present disclosure, the control system according to any one of the eleventh to fifteenth aspects is configured so that the electronic controller includes a first controller configured to control the electric motor and a second controller configured to control the electric actuator. Further, the first controller is integrated with the second controller. With the control system according to the eighteenth aspect, the first controller can be integrated with the second controller. This decreases the number of parts.

In accordance with a nineteenth aspect of the present disclosure, the control system according to the sixteenth or seventeenth aspect further comprises a first communication unit and a second communication unit. The first communication unit is connected to the first controller and provided on the drive unit. The second communication unit is connected to the second controller and provided on the brake control device. The first communication unit and the second communication unit are connected communicably through wired or wireless communication. With the control system according to the nineteenth aspect, the first communication unit and the second communication unit are connected communicably through wired or wireless communication. This allows for transmission and reception of information between the first communication unit and the second communication unit in a preferred manner.

In accordance with a twentieth aspect of the present disclosure, the control system according to the nineteenth aspect is configured so that the first controller is integrated with the first communication unit. With the control system according to the twentieth aspect, the first controller can be integrated with the first communication unit. This simplifies the configuration of the control system.

In accordance with a twenty-first aspect of the present disclosure, the control system according to the nineteenth or twentieth aspect is configured so that the second controller is integrated with the second communication unit. With the control system according to the twenty-first aspect, the second controller can be integrated with the second communication unit. This simplifies the configuration of the control system.

The human-powered vehicle control device and the human-powered vehicle control system in accordance with the present disclosure can optimally control the motor that assists in propulsion of the human-powered vehicle.

BRIEF DESCRIPTION OF THE DRAWINGS

Referring now to the attached drawings which form a part of this original disclosure.

DETAILED DESCRIPTION OF EMBODIMENTS

Figure 1:
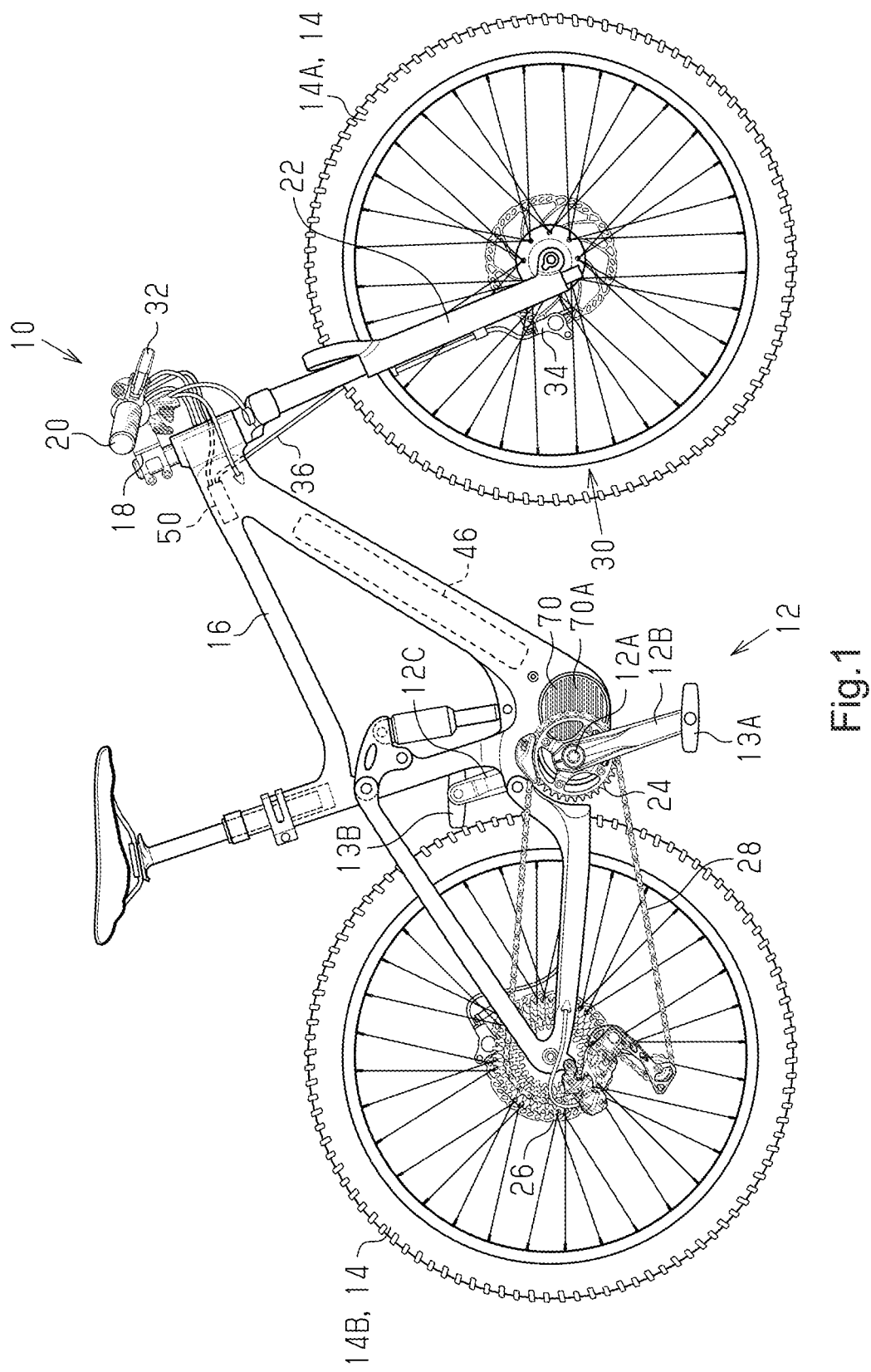
FIG. 1 is a side view of a human-powered vehicle including a human-powered vehicle control device and a human-powered vehicle control system in accordance with a first embodiment.
Figure 2:
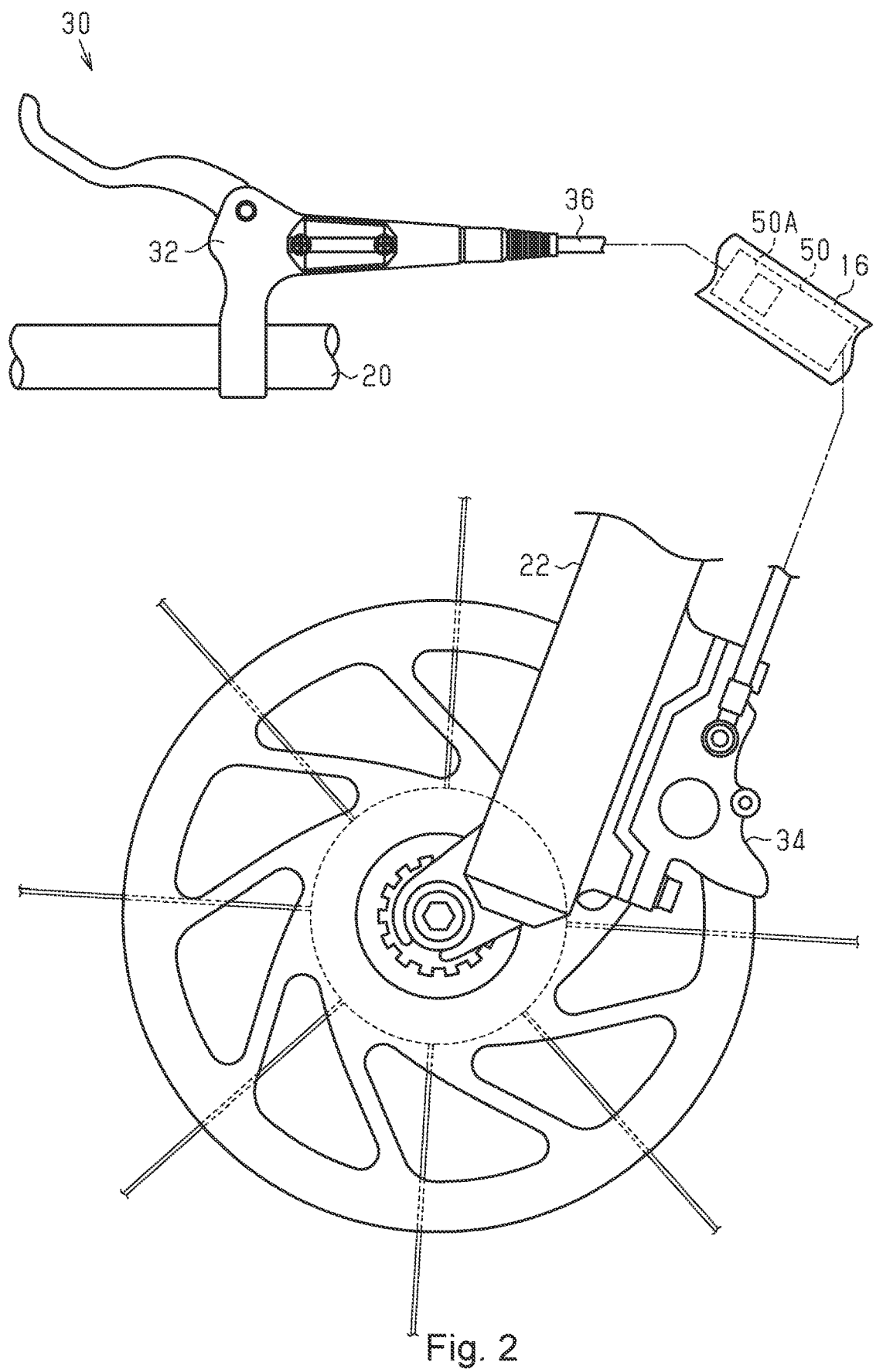
FIG. 2 is a plan view of a brake device shown in FIG. 1.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control system 40 (also referred to as the control system 40) and a human-powered vehicle control device 80 (also referred to as the control device 80) in accordance with a first embodiment will now be described with reference to FIGS. 1 to 7. A human-powered vehicle 10 is a vehicle that includes at least one wheel and can be driven by at least a human driving force H. Examples of the human-powered vehicle 10 include various types of bicycles such as a mountain bike, a road bike, a city bike, a cargo bike, a handcycle, and a recumbent bike. There is no limit to the number of wheels of the human-powered vehicle 10. The human-powered vehicle 10 also includes, for example, a unicycle or a vehicle having three or more wheels. The human-powered vehicle 10 includes an electric bicycle (e-bike) that uses a drive force of an electric motor for propulsion in addition to the human driving force H. The e-bike includes an electric assist bicycle that assists in propulsion with an electric motor. In the embodiment described hereafter, the human-powered vehicle 10 will be described as an electric assist bicycle that is also a mountain bike.

The human-powered vehicle 10 includes a crank 12 to which the human driving force H is input. The human-powered vehicle 10 further includes at least one wheel 14 and a frame 16. The human-powered vehicle 10 includes a first wheel 14A and a second wheel 14B. The crank 12 includes an input rotational shaft 12A, a first crank arm 12B, and a second crank arm 12C. The input rotational shaft 12A is rotatable relative to the frame 16. The first crank arm 12B is provided on a first axial end of the input rotational shaft 12A, and the second crank arm 12C is provided on a second axial end of the input rotational shaft 12A. In the present embodiment, the input rotational shaft 12A is a crank axle. A first pedal 13A is connected to the first crank arm 12B. A second pedal 13B is connected to the second crank arm 12C.

A drive mechanism includes a first rotational body 24 connected to the input rotational shaft 12A. The input rotational shaft 12A and the first rotational body 24 can be coupled to rotate integrally with each other. Alternatively, the input rotational shaft 12A and the first rotational body 24 can be coupled by a first one-way clutch. The first one-way clutch is configured to rotate the first rotational body 24 forward in a case where the crank 12 is rotated forward and allow relative rotation of the crank 12 and the first rotational body 24 in a case where the crank 12 is rotated rearward. The first rotational body 24 includes a sprocket, a pulley, or a bevel gear. The drive mechanism further includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is connected to the second wheel 14B. The second rotational body 26 includes a sprocket, a pulley, or a bevel gear. Preferably, a second one-way clutch is provided between the second rotational body 26 and the second wheel 14B. The second one-way clutch is configured to rotate the second wheel 14B forward in a case where the second rotational body 26 is rotated forward and allow relative rotation of the second rotational body 26 and the second wheel 14B in a case where the second rotational body 26 is rotated rearward. The human-powered vehicle 10 can include a transmission. The transmission includes at least one of an external transmission device and an internal transmission device. An external transmission device includes, for example, a derailleur, the first rotational body 24, and the second rotational body 26. A derailleur includes at least one of a front derailleur and a rear derailleur. The first rotational body 24 can include sprockets. The second rotational body 26 can include sprockets. An internal transmission device can be provided, for example, on a hub of the second wheel 14B or in a power transmission path extending from the input rotational shaft 12A to the first rotational body 24.

The first wheel 14A is attached to the frame 16 by a front fork 22. A handlebar 20 is connected to the front fork 22 by a stem 18. In the present embodiment, the second wheel 14B is connected to the crank 12 by the drive mechanism. Alternatively, at least one of the second wheel 14B and the first wheel 14A can be connected to the crank 12 by the drive mechanism.

The human-powered vehicle 10 includes the human-powered vehicle control system 40. The human-powered vehicle 10 includes a drive unit 70, a brake device 30, and a brake control device 50. The drive unit 70 is provided with an electric motor 72 that assists in propulsion of the human-powered vehicle 10. The brake device 30 generates brake force. The brake control device 50 controls the brake force with an electric actuator 52 differing from the electric motor 72. The human-powered vehicle control system 40 includes the human-powered vehicle control device 80, the drive unit 70, and the brake control device 50.

The control system 40 further includes a battery 46. The battery 46 includes one or more battery cells. Each battery cell includes a rechargeable battery. The battery 46 is configured to supply the control device 80 with electric power. Preferably, the battery 46 is communicably connected to an electronic controller 82 of the control device 80 via an electric cable or a wireless communication device. The battery 46 is configured to establish communication with the electronic controller 82 through, for example, power line communication (PLC), Controller Area Network (CAN), or Universal Asynchronous Receiver/Transmitter (UART).

The brake device 30 includes a brake operating device 32, a brake actuating device 34, and a connecting member 36. The brake device 30 applies brake force to the wheel 14. The brake operating device 32 is connected to the brake actuating device 34 to operate the brake actuating device 34. The brake actuating device 34 applies a brake force to the first wheel 14A. The brake actuating device 34 can apply a brake force to the second wheel 14B. The connecting member 36 connects a main body 50A of the brake control device 50 to the brake operating device 32 and the brake actuating device 34.

The brake operating device 32 is provided on, for example, the handlebar 20. The brake actuating device 34 can be a disc brake system, a rim brake system, or a roller brake system. In the present embodiment, the brake device 30 is a disc brake system, and the brake actuating device 34 is a caliper. The brake actuating device 34 is configured to brake a disc brake rotor provided on the wheel 14. Preferably, the brake device 30 uses pressure of a fluid to generate the brake force. The fluid is, for example, hydraulic oil. The connecting member 36 is filled with the fluid. The connecting member 36 is a brake hose.

The brake device 30 uses the movement of the fluid resulting from operation of the brake operating device 32 to actuate the brake actuating device 34. The brake actuating device 34 is actuated in accordance with the operation amount of the brake operating device 32. A greater operation amount of the brake operating device 32 produces a greater brake force of the brake actuating device 34.

Figure 3:
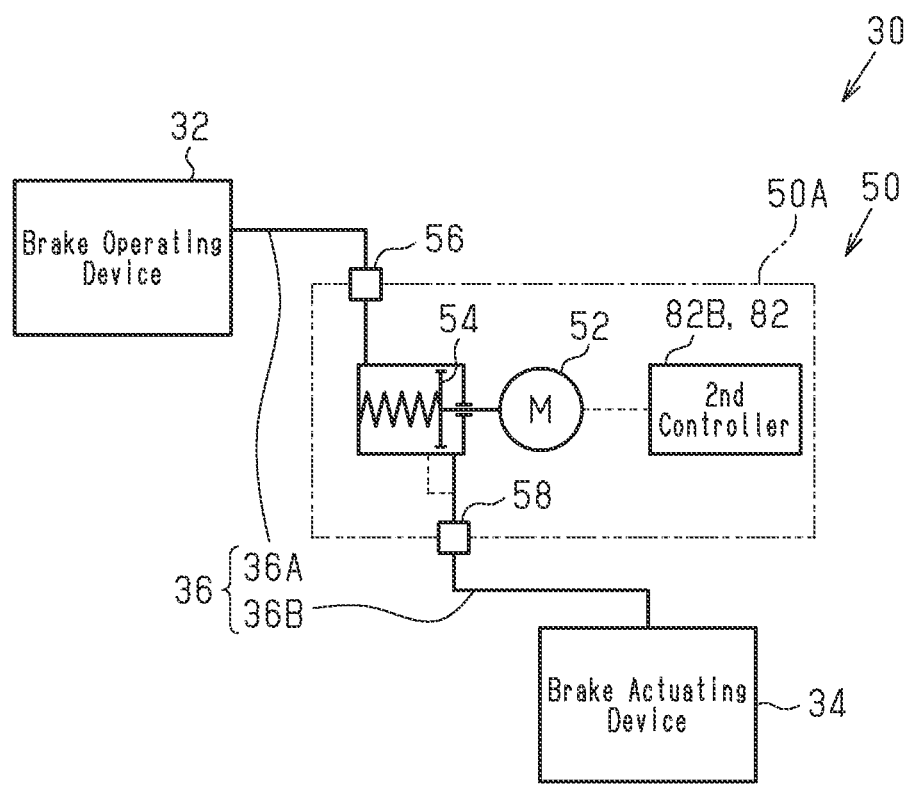
FIG. 3 is a schematic diagram of the brake device shown in FIG. 2 and a brake control device.
Figure 4:
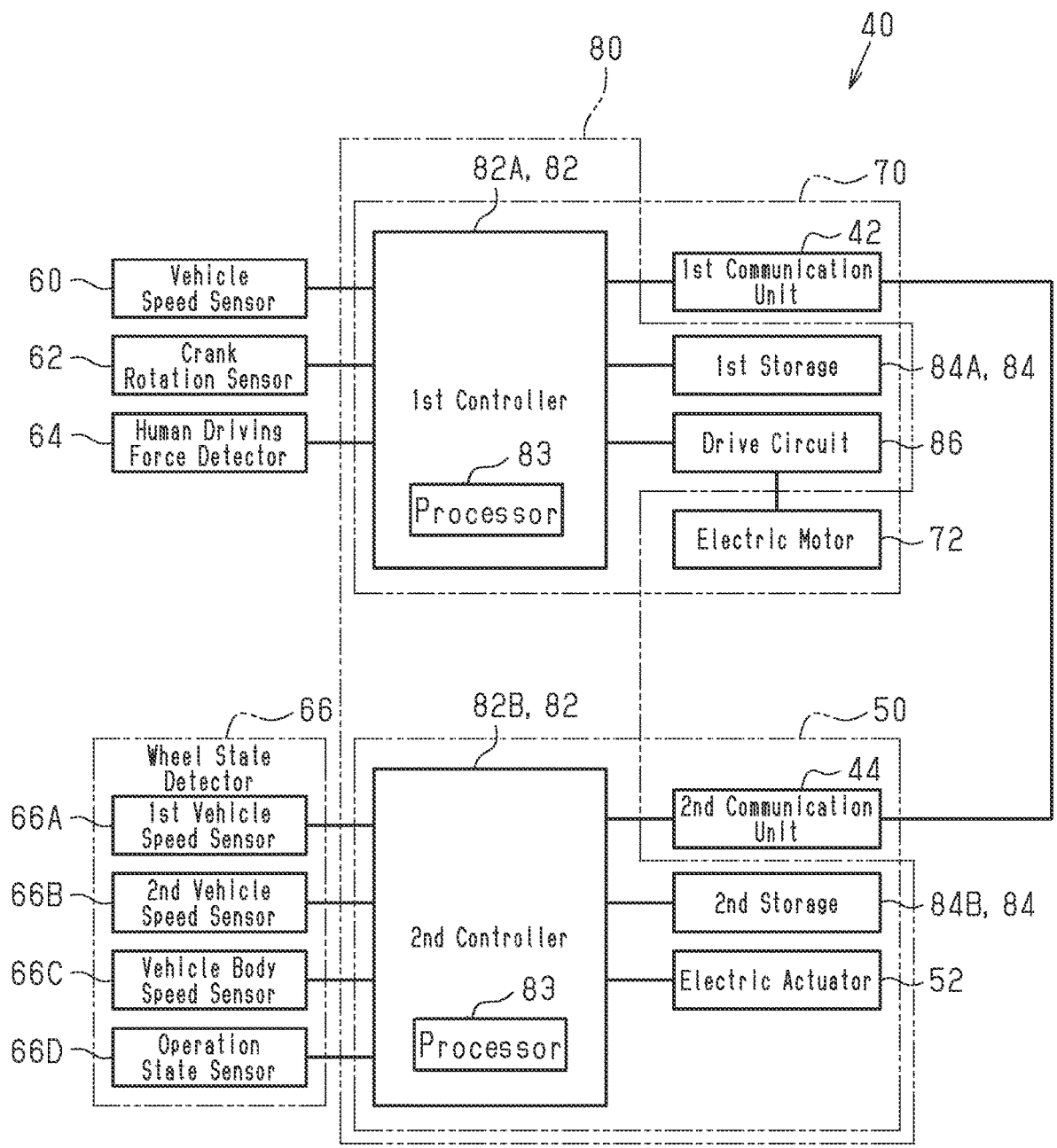
FIG. 4 is a block diagram showing the electrical configuration of the human-powered vehicle including the control device and the control system in accordance with the first embodiment.

As shown in FIGS. 3 and 4, the human-powered vehicle 10 includes the brake control device 50 configured to control the brake force produced by the brake device 30. The brake control device 50 drives a valve 54 provided in a flow passage of the fluid with the electric actuator 52. Preferably, the brake control device 50 is formed integrally with the brake device 30. The brake control device 50 is configured to change the relationship of the operation amount of the brake operating device 32 and the brake force. The brake control device 50 includes the main body 50A. The main body 50A is, for example, provided on the frame 16. In the present embodiment, the main body 50A is provided inside the frame 16. The main body 50A can be attached to an outer surface of the frame 16. The main body 50A can be provided on the stem 18, the handlebar 20, or the front fork 22.

As shown in FIG. 3, the main body 50A includes the electric actuator 52 and the valve 54. The valve 54 controls the pressure of the fluid between the brake operating device 32 and the brake actuating device 34. Preferably, the valve 54 is disposed in a fluid chamber of the main body 50A. The electric actuator 52 is, for example, an electric motor. The electric actuator 52 can be a solenoid. The electric actuator 52 is configured to change the pressure of the fluid. Preferably, the brake control device 50 includes a conversion mechanism and a transmission mechanism. The conversion mechanism converts the rotational motion of a rotational body of the electric actuator 52 into linear action, and transmits the linear action to the valve 54. The transmission mechanism changes the speed of the rotational motion of the rotational body of the electric actuator 52, and transmits the rotational motion to the conversion mechanism.

The connecting member 36 includes a first connecting member 36A and a second connecting member 36B. The main body 50A includes a first port 56 and a second port 58. The first port 56 is connected to the brake operating device 32 by the first connecting member 36A. The second port 58 is connected to the brake actuating device 34 by the second connecting member 36B. The valve 54 changes the circulation state of the fluid between the first port 56 and the second port 58. The electric actuator 52 is electrically connected to a power supply that supplies the electric actuator 52 with electric power. Preferably, the power supply is the battery 46, which is electrically connected to the electric motor 72. Another power supply dedicated to the brake control device 50 can be prepared in addition to the battery 46.

The electric motor 72 of the drive unit 70 includes one or more electric motors. An electric motor is, for example, a brushless motor. The electric motor 72 is configured to transmit a rotational force to at least one of the first wheel 14A and a power transmission path of the human driving force H extending from the pedals 13A and 13B to the second wheel 14B. The power transmission path of the human driving force H from the pedals 13A and 13B to the second wheel 14B includes the second wheel 14B. In the present embodiment, the electric motor 72 is provided on the frame 16 of the human-powered vehicle 10 and configured to transmit a rotational force to the first rotational body 24. Thus, the motor 40 constitutes an assist motor.

The electric motor 72 is provided in a housing 70A. The housing 70A is provided on the frame 16. The housing 70A is, for example, attached to the frame 16 in a detachable manner. The electric motor 72 and the housing 70A form the drive unit 70. The drive unit 70 can include a speed reducer connected to an output shaft of the electric motor 72. In the present embodiment, the housing 70A rotatably supports the input rotational shaft 12A. Preferably, in the present embodiment, a third one-way clutch is provided in the power transmission path between the electric motor 72 and the input rotational shaft 12A. The third one-way clutch is configured to restrict transmission of the rotational force of the crank 12 to the electric motor 72 in a case where the input rotational shaft 12A is rotated in a direction in which the human-powered vehicle 10 moves forward. In a case where the electric motor 72 is provided on at least one of the second wheel 14B and the first wheel 14A, the electric motor 72 can be provided on a hub and form a hub motor with the hub.

The control device 80 includes the electronic controller 82. The electronic controller 82 includes one or more processors 83 that execute predetermined control programs. The processors 83 of the electronic controller 82 include, for example, a central processing unit (CPU) or a micro-processing unit (MPU). The processors 83 of the electronic controller 82 can be provided at separate positions. For example, some of the processors 83 can be provided on the human-powered vehicle 10, and the other processors 83 can be provided in a server connected to the internet. In a case where the processors are provided at separate positions, the processors 83 are communicably connected to one another via a wireless communication device. The electronic controller 82 can include one or more microcomputers. Thus, the term "electronic controller" as used herein refers to hardware that executes a software program, and does not include a human.

As shown in FIG. 4, preferably, the electronic controller 82 includes a first controller 82A that controls the electric motor 72 and a second controller 82B that controls the electric actuator 52. The first controller 82A is provided at the drive unit 70, and the second controller 82B is provided at the brake control device 50. Part of the first controller 82A can be provided at only the drive unit 70. The first controller 82A can be partially or entirely provided at the brake control device 50. Part of the second controller 82B can be provided at only the brake control device 50. The second controller 82B can be partially or entirely provided at the drive unit 70.

The first controller 82A includes one or more processors 83 that execute predetermined control programs. The processors 83 of the first controller 82A include, for example, a CPU or an MPU. The processors 83 of the first controller 82A can be provided at separate positions. In a case where the processors 83 are provided at separate positions, the processors 83 are communicably connected to one another via a wireless communication device. The first controller 82A can include one or more microcomputers. Thus, the term "first controller" as used herein refers to hardware that executes a software program, and does not include a human.

The second controller 82B includes one or more processors 83 that execute predetermined control programs. The processors 83 of the second controller 82B include, for example, a CPU or an MPU. The processors 83 of the second controller 82B can be provided at separate positions. In a case where the processors 83 are provided at separate positions, the processors 83 are communicably connected to one another via a wireless communication device. The second controller 82B can include one or more microcomputers. Thus, the term "second controller" as used herein refers to hardware that executes a software program, and does not include a human.

Preferably, the control device 80 further includes storage 84. The storage 84 stores control programs and information used for control processes. The storage 84 includes any computer storage device or any non-transitory computer-readable medium with the sole exception of a transitory, propagating signal. For example, the storage 64 includes a nonvolatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM).

Preferably, the storage 84 includes first storage 84A and second storage 84B. The first storage 84A is provided on the drive unit 70, and the second storage 84B is provided on the brake control device 50. Part of the first storage 84A can be provided on only the drive unit 70. The first storage 84A can be partially or entirely provided on the brake control device 50. Part of the second storage 84B can be provided on only the brake control device 50. The second storage 84B can be partially or entirely provided on the drive unit 70.

The first storage 84A stores control programs and information used for control processes. The first storage 84A includes any computer storage device or any non-transitory computer-readable medium with the sole exception of a transitory, propagating signal. For example, the storage 64 includes a nonvolatile memory and a volatile memory. A non-volatile memory includes, for example, at least one of a ROM, an EPROM, an EEPROM, and a flash memory. A volatile memory includes, for example, a RAM. The first storage 84A stores, for example, control programs related to the electric motor 72 and information used for control processes.

The second storage 84B stores control programs and information used for control processes. The second storage 84B includes any computer storage device or any non-transitory computer-readable medium with the sole exception of a transitory, propagating signal. For example, the storage 64 includes a nonvolatile memory and a volatile memory. A non-volatile memory includes, for example, at least one of a ROM, an EPROM, an EEPROM, and a flash memory. A volatile memory includes, for example, a RAM. The second storage 84B stores, for example, control programs related to the brake control device 50 and information used for control processes.

Preferably, the control system 40 further includes a first communication unit 42 and a second communication unit 44. The first communication unit 42 can also be referred to as a first communicator. The second communication unit 44 can also be referred to as a second communicator. Thus, the terms "communication unit" and "communicator" as used herein refers to hardware for carrying out wired or wireless communication. The first communication unit 42 is connected to the first controller 82A and provided on the drive unit 70. The second communication unit 44 is connected to the second controller 82B and provided on the brake control device 50. The first communication unit 42 and the second communication unit 44 are connected communicably through wired or wireless communication. The second communication unit 44 transmits, for example, information related to an actuation state of the brake control device 50 to the first communication unit 42.

Preferably, the first controller 82A is integrated with the first communication unit 42. For example, the first controller 82A and the first communication unit 42 are provided on the same circuit board. Preferably, the second controller 82B is integrated with the second communication unit 44. For example, the second controller 82B and the second communication unit 44 are provided on the same circuit board.

Preferably, the control device 80 further includes a drive circuit 86 of the electric motor 72. Preferably, the drive circuit 86 and the electronic controller 82 are provided in the housing 70A of the drive unit 70. For example, the drive circuit 86 and the electronic controller 82 can be provided on the same circuit board. The drive circuit 86 includes an inverter circuit. The drive circuit 86 controls the electric power supplied from the battery 46 to the electric motor 72. The drive circuit 86 is connected to the electronic controller 82 via a conductive wire, an electric cable or a wireless communication device, and the like. The drive circuit 86 drives the electric motor 72 in response to control signals from the electronic controller 82.

Preferably, the human-powered vehicle 10 further includes at least one of a vehicle speed sensor 60, a crank rotation sensor 62, and a human driving force detector 64. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 60 is configured to detect information related to the vehicle speed V of the human-powered vehicle 10. In the present embodiment, the vehicle speed sensor 60 is configured to detect information related to the rotational speed W of the at least one wheel 14 of the human-powered vehicle 10. For example, the vehicle speed sensor 60 is configured to detect a magnet provided on the at least one wheel 14 of the human-powered vehicle 10. For example, the vehicle speed sensor 60 is configured to output a predetermined number of detection signals during a period in which one of the at least one wheel 14 completes one rotation. The predetermined number is, for example, one. The vehicle speed sensor 60 outputs a signal corresponding to the rotational speed W of the wheel 14. The electronic controller 82 can calculate the vehicle speed V of the human-powered vehicle 10 based on the signal corresponding to the rotational speed W of the wheel 14 and information related to the circumferential length of the wheel 14. The storage 84 stores the information related to the circumferential length of the wheel 14.

The vehicle speed sensor 60 includes, for example, a magnetic sensor such as a magnetic reed that forms a reed switch or a Hall element. The vehicle speed sensor 60 can be mounted on a chainstay of the frame 16 of the human-powered vehicle 10 and configured to detect a magnet mounted on the second wheel 14B. Alternatively, the vehicle speed sensor 60 can be provided on the front fork 22 and configured to detect a magnet mounted on the first wheel 14A. In the present embodiment, the vehicle speed sensor 60 is configured so that a reed switch detects a magnet whenever the wheel 14 rotates once. The vehicle speed sensor 60 can have any configuration as long as information related to the vehicle speed V of the human-powered vehicle 10 is obtained. For example, the vehicle speed sensor 60 does not have to be configured to detect the magnet provided on the wheel 14 and can be configured to detect a slit provided in a disc brake. Alternatively, the vehicle speed sensor 60 can include a global positioning system (GPS) receiver or an optical sensor and the like. In a case where the vehicle speed sensor 60 includes a GPS receiver, the electronic controller 82 can calculate the vehicle speed V from the time and the distance moved. The vehicle speed sensor 60 is connected to the electronic controller 82 via a wireless communication device or an electric cable.

The crank rotation sensor 62 is configured to detect information related to the rotational speed C of the input rotational shaft 12A. The crank rotation sensor 62 is provided on, for example, the frame 16 or the drive unit 70 of the human-powered vehicle 10. The crank rotation sensor 62 can be provided on the housing 70A of the drive unit 70. The crank rotation sensor 62 includes a magnetic sensor that outputs a signal corresponding to the strength of the magnetic field. A ring-shaped magnet of which the magnetic field changes in a circumferential direction is provided on the input rotational shaft 12A, a member that is rotated in cooperation with the input rotational shaft 12A, or in the power transmission path from the input rotational shaft 12A to the first rotational body 24. The member rotated in cooperation with the input rotational shaft 12A can include the output shaft of the electric motor 72.

The crank rotation sensor 62 outputs a signal corresponding to the rotational speed C of the input rotational shaft 12A. For example, in a case where the first one-way clutch is not provided between the input rotational shaft 12A and the first rotational body 24, the magnet can be provided on the first rotational body 24. The crank rotation sensor 62 can have any configuration as long as information related to the rotational speed C of the input rotational shaft 12A is obtained. Instead of the magnetic sensor, the crank rotation sensor 62 can include an optical sensor, an acceleration sensor, a gyro sensor, a torque sensor, or the like. The crank rotation sensor 62 is connected to the electronic controller 82 via a wireless communication device or an electric cable.

The human driving force detector 64 is configured to detect information related to the human driving force H. The human driving force detector 64 is provided on, for example, the frame 16, the drive unit 70, the crank 12, or the pedals 13A and 13B of the human-powered vehicle 10. The human driving force detector 64 can be provided on the housing 70A of the drive unit 70. The human driving force detector 64 includes, for example, a torque sensor. The torque sensor is configured to output a signal corresponding to torque applied to the crank 12 by the human driving force H. For example, in a case where the first one-way clutch is provided in the power transmission path, it is preferred that the torque sensor be provided at an upstream side of the first one-way clutch in the power transmission path. The torque sensor includes a strain sensor, a magnetostrictive sensor, a pressure sensor, and the like. A strain sensor includes a strain gauge.

The torque sensor is provided in the power transmission path or near a member included in the power transmission path. The member included in the power transmission path is, for example, the input rotational shaft 12A, the crank arms 12B and 12C, the pedals 13A and 13B, or a member that transmits the human driving force H between the input rotational shaft 12A and the first rotational body 24. The human driving force detector 64 is connected to the electronic controller 82 via a wireless communication device or an electric cable. The human driving force detector 64 can have any configuration as long as information related to the human driving force H is obtained. For example, the human driving force detector 64 can include a sensor that detects the pressure applied to the pedals 13A and 13B, a sensor that detects the tension on the chain, and the like.

The first controller 82A is configured to control the electric motor 72. Preferably, the first controller 82A is configured to control the electric motor 72 in accordance with the human driving force H input to the human-powered vehicle 10. The human driving force H can be expressed in torque or power.

The first controller 82A is, for example, configured to control the electric motor 72 so that the assist level A of the electric motor 72 becomes a predetermined assist level A. The assist level A includes at least one of a ratio of output of the electric motor 72 to the human driving force H input to the human-powered vehicle 10, the maximum value of the output of the electric motor 72, and a restriction level R that restricts changes in the output of the electric motor 72 in a case where the output of the electric motor 72 decreases. The assist level A includes a ratio of the assist force produced by the electric motor 72 to the human driving force H or a ratio of the assist force produced by the electric motor 72 to the rotational speed of the crank 12. The ratio of the assist force produced by the electric motor 72 to the human driving force H is also referred to as the assist ratio. For example, the first controller 82A is configured to control the electric motor 72 so that the assist force produced by the electric motor 72 relative to the human driving force H becomes a predetermined ratio. The human driving force H corresponds to the propulsion force of the human-powered vehicle 10 produced by a user rotating the crank 12. The assist force corresponds to the propulsion force of the human-powered vehicle 10 produced by the rotation of the electric motor 72. The predetermined ratio does not have to be a constant value. For example, the predetermined ratio can be changed in accordance with the human driving force H, the rotational speed C of the input rotational shaft 12A, or the vehicle speed V. Alternatively, the predetermined ratio can be changed in accordance with two of or every one of the human driving force H, the rotational speed C of the input rotational shaft 12A, and the vehicle speed V.

In a case where the human driving force H and the assist force are expressed in torque, the human driving force H is referred to as a human torque HT, and the assist force is referred to as an assist torque MT. In a case where the human driving force H and the assist force are expressed in power, the human driving force H is referred to as power based on a human force HW, and the assist force is referred to as power based on an assist force MW. The ratio can be the torque ratio of the assist torque MT to the human torque HT of the human-powered vehicle 10 or a ratio of the power based on the assist force MW produced by the electric motor 72 to the power based on the human force HW.

In the drive unit 70 of the present embodiment, the crank 12 is connected to the first rotational body 24 without a transmission, and the output of the electric motor 72 is input to the first rotational body 24. In a case where the crank 12 is connected to the first rotational body 24 without a transmission and the output of the electric motor 72 is input to the first rotational body 24, the human driving force H corresponds to the driving force input to the first rotational body 24 by the user rotating the crank 12. In a case where the crank 12 is connected to the first rotational body 24 without a transmission and the output of the electric motor 72 is input to the first rotational body 24, the assist force corresponds to the driving force input to the first rotational body 24 by the rotation of the electric motor 72. In a case where the output of the electric motor 72 is input to the first rotational body 24 via a speed reducer, the assist force corresponds to the output of the speed reducer.

If the electric motor 72 is provided on the second wheel 14B, the human driving force H corresponds to the output of the second wheel 14B in a case where the second wheel 14B is driven only by the user. If the electric motor 72 is provided on the second wheel 14B, the assist force corresponds to the output of the second wheel 14B in a case where the second wheel 14B is driven only by the electric motor 72. If the electric motor 72 is provided on the first wheel 14A, the human driving force H corresponds to the output of the second wheel 14B in a case where the second wheel 14B is driven only by the user. Further, if the electric motor 72 is provided on the first wheel 14A, the assist force corresponds to the output of the first wheel 14A in a case where the first wheel 14A is driven only by the electric motor 72.

The first controller 82A controls the electric motor 72 so that the assist force is less than or equal to the upper limit value MX. In a case where the output of the electric motor 72 is input to the first rotational body 24 and the assist force is expressed in torque, the first controller 82A is configured to control the electric motor 72 so that the assist torque MT is less than or equal to the upper limit value MTX. Preferably, the upper limit value MTX is a value in a range of 20 Nm or greater and 200 Nm or less. The upper limit value MTX is determined by, for example, the output characteristics of the electric motor 72. In a case where the output of the electric motor 72 is input to the first rotational body 24 and the assist force is expressed in power, the first controller 82A is configured to control the electric motor 72 so that the power based on assist force MW is less than or equal to the upper limit value MWX.

Preferably, the first controller 82A is configured to change the restriction level R for changes in the output of the electric motor 72. An increase in the restriction level R for changes in the output of the electric motor 72 decreases a change amount in the output of the electric motor 72 per unit time relative to a change amount in a control parameter of the electric motor 72 per unit time. A decrease in the restriction level R for changes in the output of the electric motor 72 increases a change amount in the output of the electric motor 72 per unit time relative to a change amount in the control parameter of the electric motor 72 per unit time. The control parameter of the electric motor 72 is the human driving force H or the rotational speed C of the input rotational shaft 12A. The restriction level R for changes in the output of the electric motor 72 is inversely proportional to a response speed of the electric motor 72. The response speed of the electric motor 72 is expressed by a change amount in the output of the electric motor 72 per unit time relative to a change amount in the control parameter of the electric motor 72 per unit time. An increase in the restriction level R for changes in the output of the electric motor 72 decreases the response speed of the electric motor 72.

The first controller 82A changes the restriction level R with, for example, a filter. The filter includes, for example, a low pass filter having a time constant. The first controller 82A changes the restriction level R by changing the time constant of the filter. The first controller 82A can change the restriction level R by changing the gain for calculating the output of the electric motor 72 from the human driving force H. For example, a processor executes predetermined software to implement the filter.

The second controller 82B actuates the brake control device 50 in a case where an actuation condition is satisfied. Preferably, the actuation condition is related to the state of the wheel 14. The actuation condition is satisfied, for example, in at least one of a case where the difference between the rotational speed of the first wheel 14A and the rotational speed of the second wheel 14B is greater than or equal to a predetermined rotational speed, a case where the difference between the vehicle body speed and the vehicle speed calculated from the rotational speed of the wheel 14 is greater than or equal to a predetermined speed, a case where the operation amount of the brake operating device 32 per predetermined time is greater than or equal to a predetermined operation amount, and a case where the first wheel 14A is locked or skidding.

Preferably, the human-powered vehicle 10 includes a wheel state detector 66. In a case where the actuation condition is that the difference between the rotational speed of the first wheel 14A and the rotational speed of the second wheel 14B is greater than or equal to a predetermined rotational speed, the wheel state detector 66 includes a first vehicle speed sensor 66A that detects the rotational speed of the first wheel 14A and a second vehicle speed sensor 66B that detects the rotational speed of the second wheel 14B. In a case where the actuation condition is that the difference between the vehicle body speed and the vehicle speed V calculated from the rotational speed of the wheel 14 is greater than or equal to a predetermined speed, the wheel state detector 66 includes a vehicle body speed sensor 66C that detects the vehicle body speed of the human-powered vehicle 10 and one of the first vehicle speed sensor 66A and the second vehicle speed sensor 66B. The vehicle body speed sensor 66C can employ any configuration. For example, the vehicle body speed sensor 66C can be configured to obtain the vehicle body speed using GPS or calculate the vehicle body speed by accumulating acceleration. In a case where the actuation condition is that the operation amount of the brake operating device 32 per predetermined time is greater than or equal to a predetermined operation amount, the wheel state detector 66 includes an operation state sensor 66D that detects the operation state of the brake operating device 32.

The second controller 82B de-actuates the brake control device 50 in a case where a de-actuation condition is satisfied. The de-actuation condition is satisfied, for example, in at least one of a case where the difference between the rotational speed of the first wheel 14A and the rotational speed of the second wheel 14B is less than the predetermined rotational speed, a case where the difference between the vehicle body speed and vehicle speed calculated from the rotational speed of the wheel 14 is less than the predetermined speed, a case where the operation amount of the brake operating device 32 per predetermined time is less than the predetermined operation amount, a case where the first wheel 14A is not locked or not skidding, and a case where a predetermined period elapses from a point of time at which the brake control device 50 was actuated.

Figure 5:
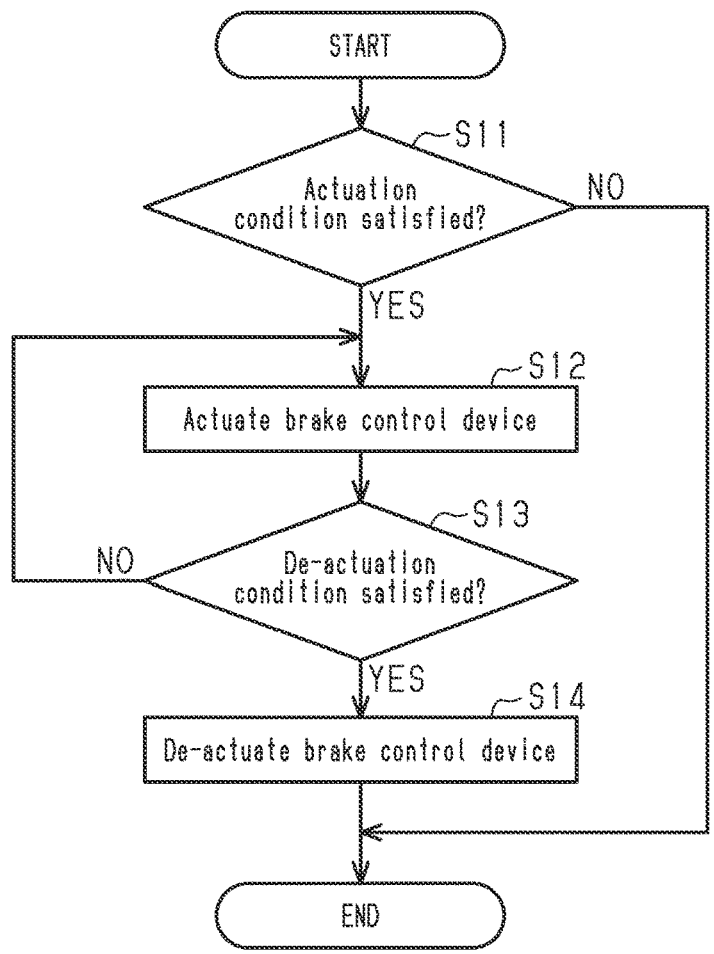
FIG. 5 is a flowchart illustrating a process executed by a second controller shown in FIG. 4 to control the brake control device.

A process executed by the second controller 82B to control the brake control device 50 will now be described with reference to FIG. 5. For example, in a case where electric power is supplied to the second controller 82B, the second controller 82B starts the process of the flowchart shown in FIG. 5 from step S11. In a case where the process of the flowchart shown in FIG. 5 ends, the second controller 82B repeats the process from step S11 in predetermined cycles until, for example, the supply of electric power stops.

In step S11, the second controller 82B determines whether the actuation condition of the brake control device 50 is satisfied. In a case where the actuation condition is satisfied, the second controller 82B proceeds to step S12. In a case where the actuation condition is not satisfied, the second controller 82B ends processing.

In step S12, the second controller 82B actuates the brake control device 50 and then proceeds to step S13.

In step S13, the second controller 82B determines whether the de-actuation condition is satisfied. In a case where the de-actuation condition is not satisfied, the second controller 82B proceeds to step S12. In a case where the de-actuation condition is satisfied, the second controller 82B proceeds to step S14.

In step S14, the second controller 82B de-actuates the brake control device 50 and then ends processing.

Preferably, the electronic controller 82 drives the electric motor 72 in a case where a predetermined condition related to a traveling state of the human-powered vehicle 10 is satisfied. The predetermined condition is satisfied, for example, in at least one of a case where the human driving force H is greater than or equal to a predetermined drive force HX, a case where the vehicle speed V is less than or equal to a predetermined vehicle speed VX, and a case where the rotational speed C of the input rotational shaft 12A is greater than or equal to a predetermined rotational speed CX.

Figure 6:
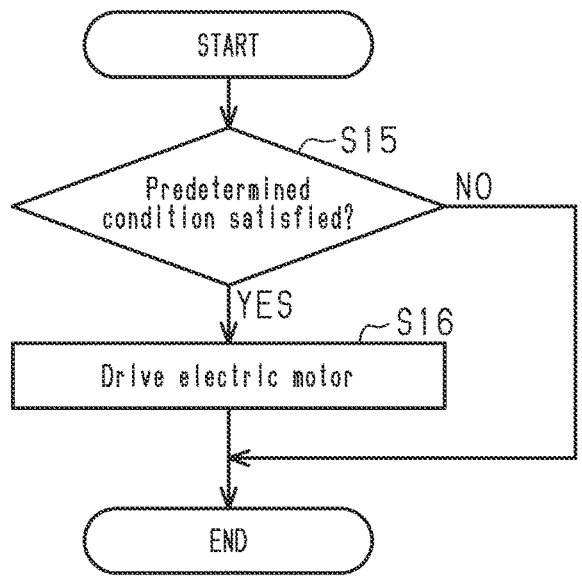
FIG. 6 is a flowchart illustrating a process executed by a first controller shown in FIG. 4 to control an electric motor in accordance with a predetermined condition.

A process executed by the first controller 82A to control the electric motor 72 will now be described with reference to FIG. 6. For example, in a case where electric power is supplied to the first controller 82A, the first controller 82A starts the process of the flowchart shown in FIG. 6 from step S15. In a case where the process of the flowchart shown in FIG. 6 ends, the first controller 82A repeats the process from step S15 in predetermined cycles, for example, until the supply of electric power stops.

In step S15, the first controller 82A determines whether the predetermined condition is satisfied. In a case where the predetermined condition is satisfied, the first controller 82A proceeds to step S16. In a case where the predetermined condition is not satisfied, the first controller 82A ends processing.

In step S16, the first controller 82A drives the electric motor 72 and then ends processing.

The electronic controller 82 controls the electric motor 72 in accordance with the actuation state of the brake control device 50. In the present embodiment, the electronic controller 82 stops driving the electric motor 72 in accordance with the actuation state of the brake control device 50. Preferably, the first controller 82A stops driving the electric motor 72 in a case where the brake control device 50 is actuated.

Preferably, the electronic controller 82 does not drive the electric motor 72 in a case where the brake control device 50 is actuated even if the predetermined condition is satisfied. Preferably, if a first condition is satisfied in a case where a control state of the electric motor 72 is a second state, the electronic controller 82 changes the control state of the electric motor 72 from the second state to a first state. Preferably, if the first condition is satisfied after stopping the electric motor 72 in a case where the brake control device 50 is actuated, the first controller 82A permits driving of the electric motor 72. Preferably, the first condition is satisfied in at least one of a case where a predetermined period TX elapses and a case where the traveling state of the human-powered vehicle 10 becomes a predetermined state. The predetermined state corresponds to, for example, a state in which the de-actuation condition of the brake control device 50 is satisfied.

Figure 7:
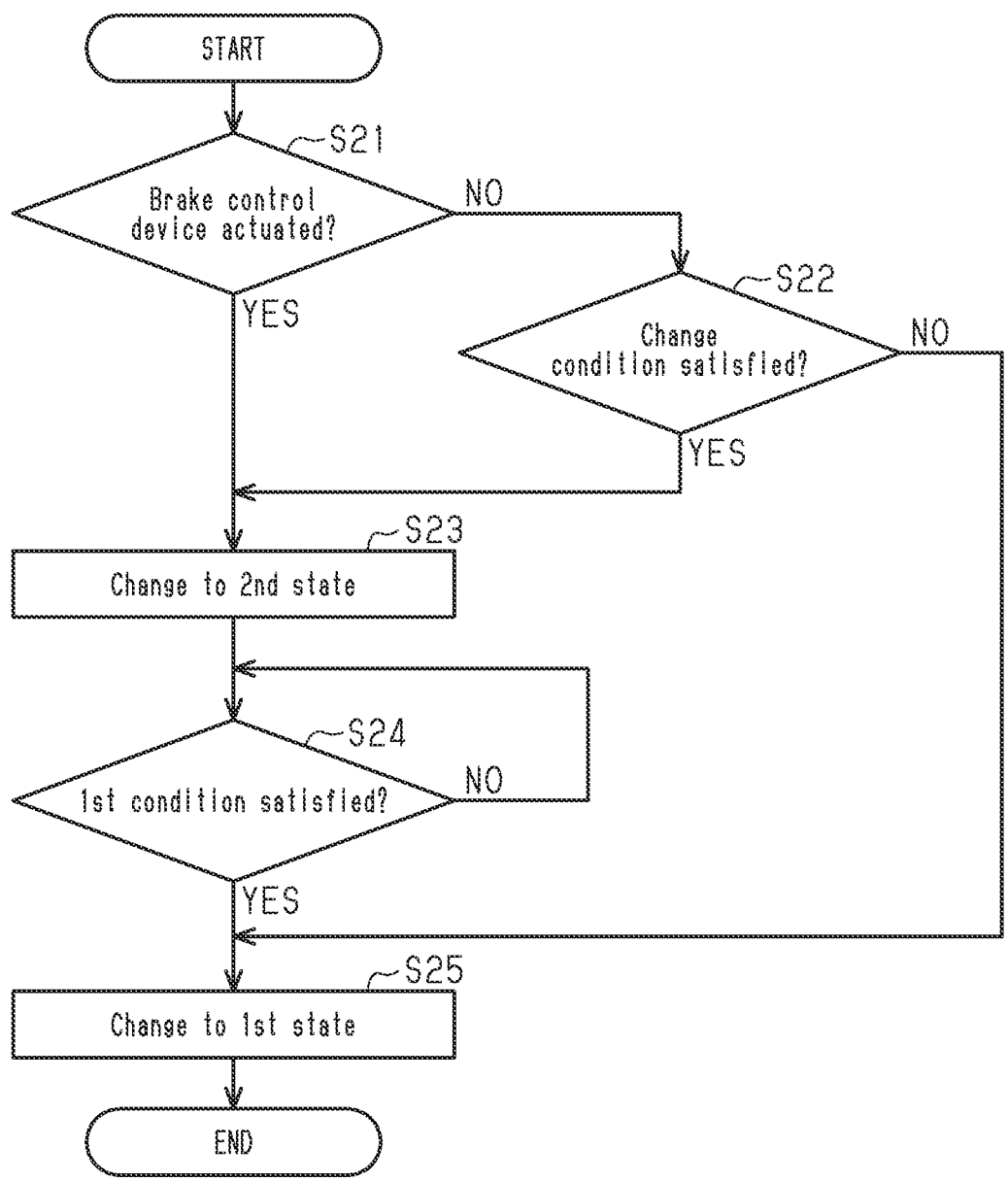
FIG. 7 is a flowchart illustrating a process executed by the first controller shown in FIG. 4 to control the electric motor.

A process executed by the first controller 82A to control the electric motor 72 will now be described with reference to FIG. 7. For example, in a case where electric power is supplied to the electronic controller 82, the electronic controller 82 starts the process of the flowchart shown in FIG. 7 from step S21. In a case where the process of the flowchart shown in FIG. 7 ends, the electronic controller 82 repeats the process from step S21 in predetermined cycles, for example, until the supply of electric power stops.

In step S21, the first controller 82A determines whether the brake control device 50 has been actuated. For example, the first controller 82A determines whether the brake control device 50 has been actuated with information received by the first communication unit 42 from the second communication unit 44. In a case where the brake control device 50 has not been actuated, the first controller 82A proceeds to step S22. In a case where the brake control device 50 has been actuated, the first controller 82A proceeds to step S23.

In step S22, the first controller 82A determines whether a change condition is satisfied. In the present embodiment, the first controller 82A determines that the change condition is satisfied, for example, in a case where the vehicle speed V is greater than or equal to the predetermined vehicle speed VX. For example, the first controller 82A determines that the change condition is satisfied in a case where the rotational speed C of the input rotational shaft 12A is greater than or equal to the predetermined rotational speed CX. For example, the first controller 82A determines that the change condition is satisfied in a case where the human driving force H is greater than or equal to the predetermined human driving force HX. In a case where the change condition is not satisfied, the first controller 82A ends processing. In a case where the change condition is satisfied, the first controller 82A proceeds to step S23.

In step S23, the first controller 82A changes the control state of the electric motor 72 to the second state and then proceeds to step S24. The second state is less in the assist level A of the electric motor 72 than the first state. Preferably, the first controller 82A stops the electric motor 72 in step S23. Preferably, the first controller 82A stops the electric motor 72 in or after step S23.

In step S24, the first controller 82A determines whether the first condition is satisfied. In a case where the first condition is not satisfied, the first controller 82A performs step S24 again. In a case where the first condition is satisfied, the first controller 82A proceeds to step S25.

In step S25, the first controller 82A changes the control state of the electric motor 72 to the first state and then ends processing. The first controller 82A permits driving of the electric motor 72 in step S25. In a case where the electric motor 72 was stopped in step S23, the first controller 82A can resume driving of the electric motor 72 in step 25 in the control state before the electric motor 72 was stopped in step S23.

The first controller 82A does not drive the electric motor 72 in the period from step S23 to step S25 even if the predetermined condition is satisfied. The first controller 82A drives the electric motor 72 in a case where the predetermined condition is satisfied in or after step S25.

Second Embodiment

Figure 8:
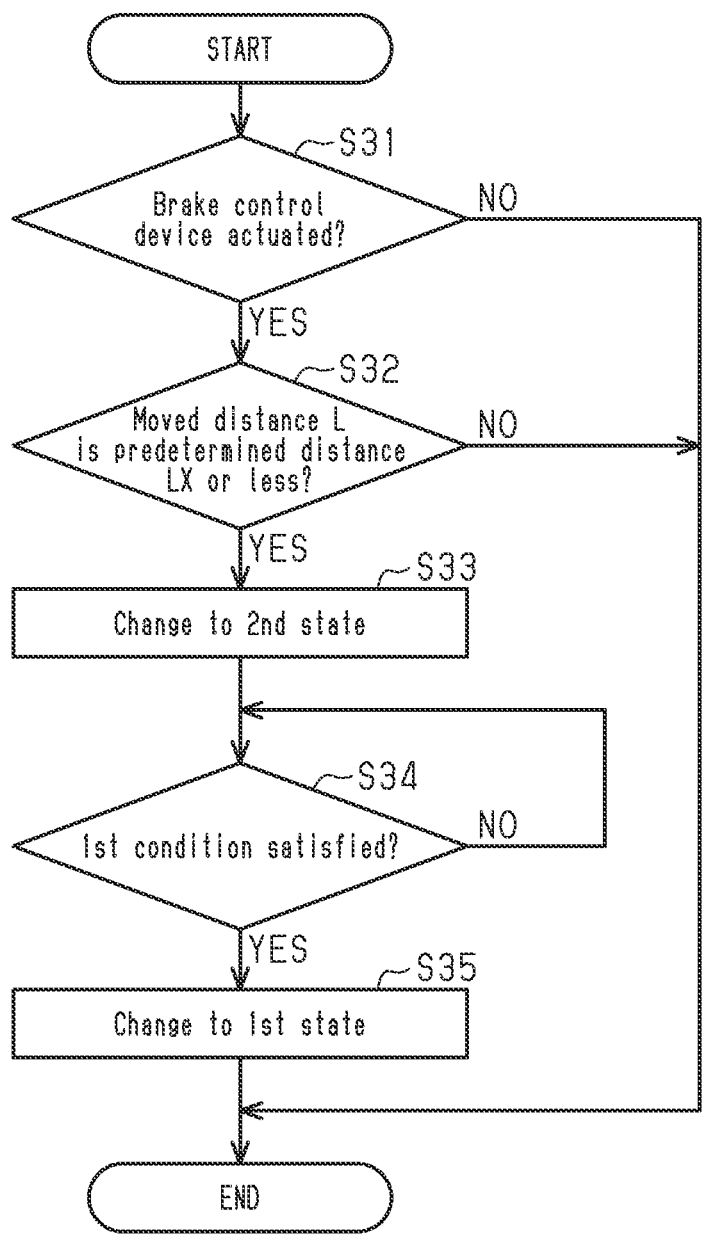
FIG. 8 is a flowchart illustrating a process executed by an electronic controller in accordance with a second embodiment to control an electric motor.

The control device 80 in accordance with a second embodiment will now be described with reference to FIG. 8. The control device 80 of the second embodiment is the same as the control device 80 of the first embodiment except in that the process of the flowchart shown in FIG. 8 is performed instead of the process of the flowchart shown in FIG. 7. Same reference numerals are given to those components in the control device 80 of the second embodiment that are the same as the corresponding components of the first embodiment. Such components will not be described in detail.

In the present embodiment, the electronic controller 82 changes the control state of the electric motor 72 from the first state to the second state in accordance with the actuation state of the brake control device 50. The second state is less in the assist level A of the electric motor 72 than the first state. Preferably, the electronic controller 82 changes the control state of the electric motor 72 from the first state to the second state in a case where the brake control device 50 is actuated.

A process executed by the first controller 82A to control the electric motor 72 will now be described with reference to FIG. 8. For example, in a case where electric power is supplied to the electronic controller 82, the electronic controller 82 starts the process of the flowchart shown in FIG. 8 from step S31. In a case where the process of the flowchart shown in FIG. 8 ends, the electronic controller 82 repeats the process from step S31 in predetermined cycles, for example, until the supply of electric power stops.

In step S31, the first controller 82A determines whether the brake control device 50 has been actuated. For example, the first controller 82A determines whether the brake control device 50 has been actuated with information received by the first communication unit 42 from the second communication unit 44. In a case where the brake control device 50 has not been actuated, the first controller 82A ends processing. In a case where the brake control device 50 has been actuated, the first controller 82A proceeds to step S32.

In step S32, the first controller 82A determines whether the moved distance L from a point of time at which the brake control device 50 was last actuated is less than or equal to a predetermined distance LX. The predetermined distance LX is, for example, 50 meters or less. The predetermined distance LX is, for example, 30 meters or greater. For example, the first controller 82A calculates the moved distance L in the same manner as step S22 of FIG. 7. In a case where the moved distance L is not less than or equal to the predetermined distance LX, the first controller 82A ends processing. In a case where the moved distance L is less than or equal to the predetermined distance LX, the first controller 82A proceeds to step S33.

In step S33, the first controller 82A changes the control state of the electric motor 72 to the second state and then proceeds to step S34.

In step S34, the first controller 82A determines whether the first condition is satisfied. In a case where the first condition is not satisfied, the first controller 82A performs step S34 again. In a case where the first condition is satisfied, the first controller 82A proceeds to step S35.

In step S35, the first controller 82A changes the control state of the electric motor 72 to the first state and then ends processing. Preferably, in step S35, the first controller 82A returns the assist level A to the assist level A before the control state was changed to the second state in step S33. In step S35, the first controller 82A can change the assist level A to the assist level A differing from the assist level A before the control state was changed to the second state in step S33.

Third Embodiment

Figure 9:
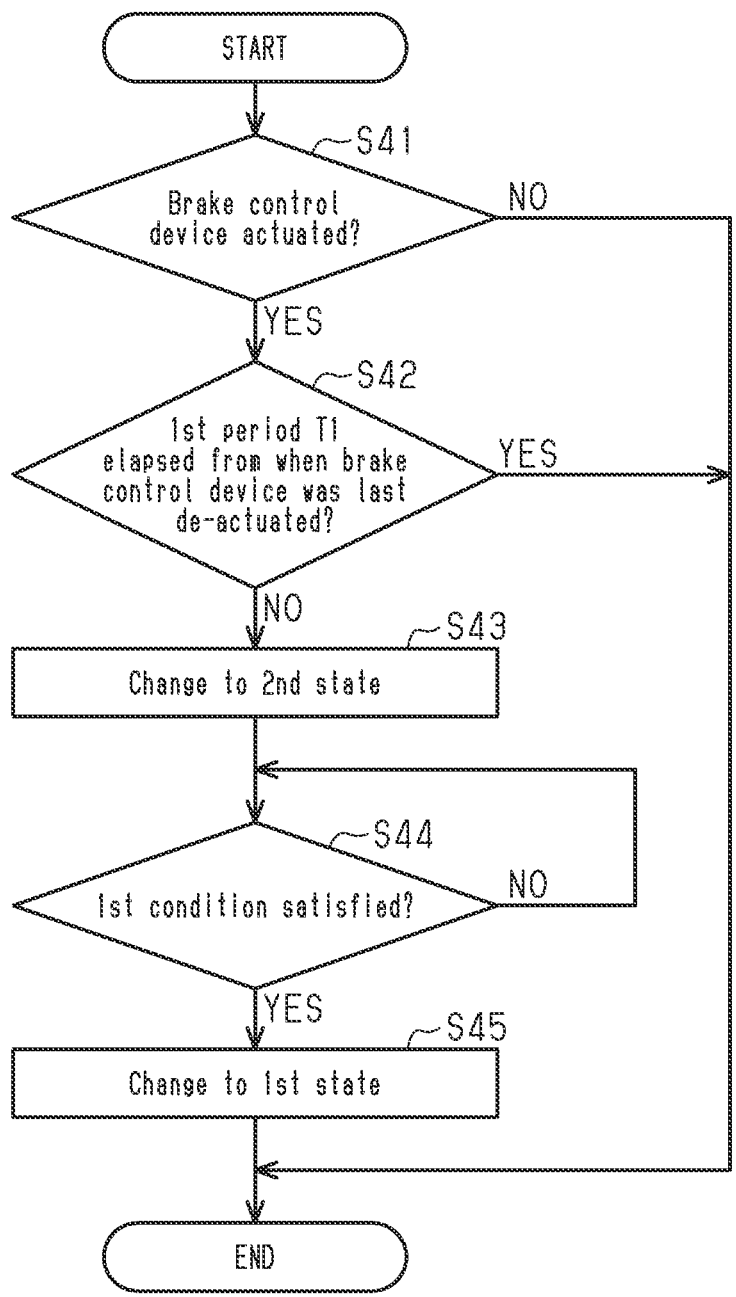
FIG. 9 is a flowchart illustrating a process executed by an electronic controller in accordance with a third embodiment to control an electric motor.

The control device 80 in accordance with a third embodiment will now be described with reference to FIG. 9. The control device 80 of the third embodiment is the same as the control device 80 of the first embodiment except in that the process of the flowchart shown in FIG. 9 is performed instead of the process of the flowchart shown in FIG. 7. Same reference numerals are given to those components in the control device 80 of the third embodiment that are the same as the corresponding components of the first and second embodiments. Such components will not be described in detail.

In the present embodiment, the electronic controller 82 changes the control state of the electric motor 72 from the first state to the second state in a case where the brake control device 50 is actuated before a first period T1 elapses from a point of time at which the brake control device 50 was de-actuated. The electronic controller 82 can change the control state of the electric motor 72 from the first state to the second state in a situation in which the brake control device 50 is repetitively actuated within a short period such as a case in which the brake control device 50 is actuated before the first period T1 elapses from a point of time at which the brake control device 50 was de-actuated.

A process executed by the first controller 82A to control the electric motor 72 will now be described with reference to FIG. 9. For example, in a case where electric power is supplied to the electronic controller 82, the electronic controller 82 starts the process of the flowchart shown in FIG. 9 from step S41. In a case where the process of the flowchart shown in FIG. 9 ends, the electronic controller 82 repeats the process from step S41 in predetermined cycles, for example, until the supply of electric power stops.

In step S41, the first controller 82A determines whether the brake control device 50 has been actuated. For example, the first controller 82A determines whether the brake control device 50 has been actuated with information received by the first communication unit 42 from the second communication unit 44. In a case where the brake control device 50 has not been actuated, the first controller 82A ends processing. In a case where the brake control device 50 has been actuated, the first controller 82A proceeds to step S42.

In step S42, the first controller 82A determines whether the first period T1 elapsed from a point of time at which the brake control device 50 was last de-actuated. The first period T1 is, for example, 5 seconds or shorter. In a case where the first period T1 has elapsed from a point of time at which the brake control device 50 was last de-actuated, the first controller 82A ends processing. In a case where the first period T1 has not elapsed from a point of time at which the brake control device 50 was last de-actuated, the first controller 82A proceeds to step S43.

In step S43, the first controller 82A changes the control state of the electric motor 72 to the second state and then proceeds to step S44. In a case where the control state of the electric motor 72 is the second state, the first controller 82A maintains the second state.

In step S44, the first controller 82A determines whether the first condition is satisfied. In a case where the first condition is not satisfied, the first controller 82A performs step S44 again. In a case where the first condition is satisfied, the first controller 82A proceeds to step S45.

In step S45, the first controller 82A changes the control state of the electric motor 72 to the first state and then ends processing. In step 45, the first controller 82A can drive the electric motor 72 in the control state before the control state of the electric motor 72 was changed to the second state in step S43.

Fourth Embodiment

Figure 10:
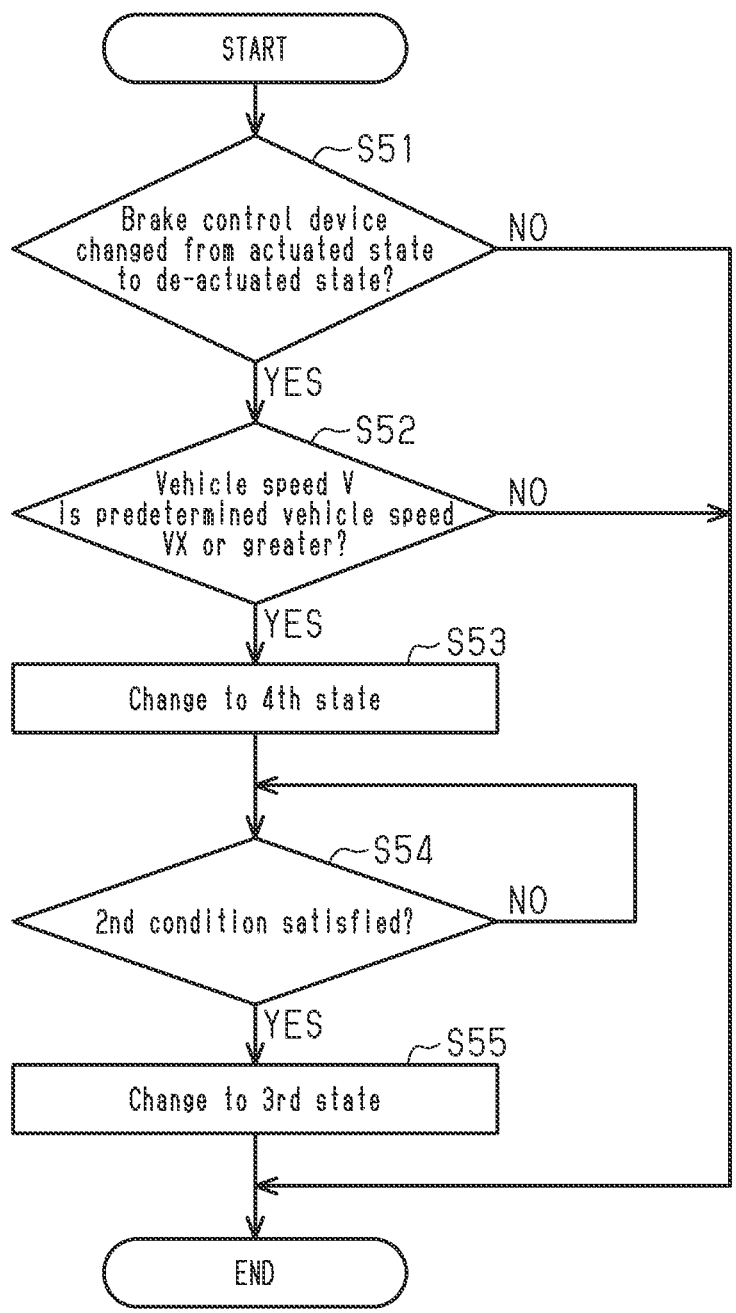
FIG. 10 is a flowchart illustrating a process executed by an electronic controller in accordance with a fourth embodiment to control an electric motor.

The control device 80 in accordance with a fourth embodiment will now be described with reference to FIG. 10. The control device 80 of the fourth embodiment is the same as the control device 80 of the first embodiment except in that the process of the flowchart shown in FIG. 10 is performed instead of the process of the flowchart shown in FIG. 7. Same reference numerals are given to those components in the control device 80 of the fourth embodiment that are the same as the corresponding components of the first, second, and third embodiments. Such components will not be described in detail.

In the present embodiment, the electronic controller 82 changes the control state of the electric motor 72 from a third state to a fourth state in accordance with the actuation state of the brake control device 50. The fourth state is greater in the assist level A of the electric motor 72 than the third state. The first state can be the same as the fourth state or different from the fourth state. The second state can be the same as the third state or different from the third state.

Preferably, in a case where the brake control device 50 is changed from an actuated state to a de-actuated state and the vehicle speed V of the human-powered vehicle 10 is greater than or equal to the predetermined vehicle speed VX, the electronic controller 82 changes the control state of the electric motor 72 from the third state to the fourth state.

Preferably, in a case where the brake control device 50 is changed from an actuated state to a de-actuated state and the vehicle speed V of the human-powered vehicle 10 is greater than or equal to the predetermined vehicle speed VX, the electronic controller 82 changes the control state of the electric motor 72 from the fourth state to the third state and then, if a second condition is satisfied, changes the control state of the electric motor 72 from the fourth state to the third state. The second condition is satisfied in at least one of a case where a second period T2 elapses and a case where the traveling state of the human-powered vehicle 10 becomes a predetermined state. The second period T2 is, for example, 3 seconds or shorter. For example, the predetermined traveling state is a state in which the rotational speed C of the input rotational shaft 12A is less than or equal to the predetermined rotational speed CX. Preferably, the predetermined traveling state is a state in which rotation of the input rotational shaft 12A is stopped. The first period T1 can be the same as the second period T2 or different from the second period T2. The predetermined rotational speed CX is, for example, 1 rpm or less.

A process executed by the first controller 82A to control the electric motor 72 will now be described with reference to FIG. 10. For example, in a case where electric power is supplied to the electronic controller 82, the electronic controller 82 starts the process of the flowchart shown in FIG. 10 from step S51. In a case where the process of the flowchart shown in FIG. 10 ends, the electronic controller 82 repeats the process from step S51 in predetermined cycles, for example, until the supply of electric power stops.

In step S51, the first controller 82A determines whether the brake control device 50 has been changed from the actuated state to the de-actuated state. In a case where the brake control device 50 has not been changed from the actuated state to the de-actuated state, the first controller 82A ends processing. In a case where the brake control device 50 has been changed from the actuated state to the de-actuated state, the first controller 82A proceeds to step S52.

In step S52, the first controller 82A determines whether the vehicle speed V is greater than or equal to the predetermined vehicle speed VX. The predetermined vehicle speed VX is, for example, 6 km per hour or greater. In a case where the vehicle speed V is not greater than or equal to the predetermined vehicle speed VX, the first controller 82A ends processing. In a case where the vehicle speed V is greater than or equal to the predetermined vehicle speed VX, the first controller 82A proceeds to step S53.

In step S53, the first controller 82A changes the control state of the electric motor 72 to the fourth state and then proceeds to step S54.

In step S54, the first controller 82A determines whether the second condition is satisfied. In a case where the second condition is not satisfied, the first controller 82A performs step S54 again. In a case where the second condition is satisfied, the first controller 82A proceeds to step S55.

In step S55, the first controller 82A changes the control state of the electric motor 72 to the third state and then ends processing. In step 55, the first controller 82A can drive the electric motor 72 in the control state before the control state of the electric motor 72 was changed to the fourth state in step S53.

Modified Examples

The description related with the above embodiments exemplifies, without any intention to limit, applicable forms of a human-powered vehicle control device and a human-powered vehicle control system according to the present disclosure. In addition to the embodiments described above, the human-powered vehicle control device and the human-powered vehicle control system according to the present disclosure are applicable to, for example, modified examples of the above embodiments that are described below and combinations of at least two of the modified examples that do not contradict each other. In the modified examples described hereafter, same reference numerals are given to those components that are the same as the corresponding components of the above embodiments. Such components will not be described in detail.

Figure 11:
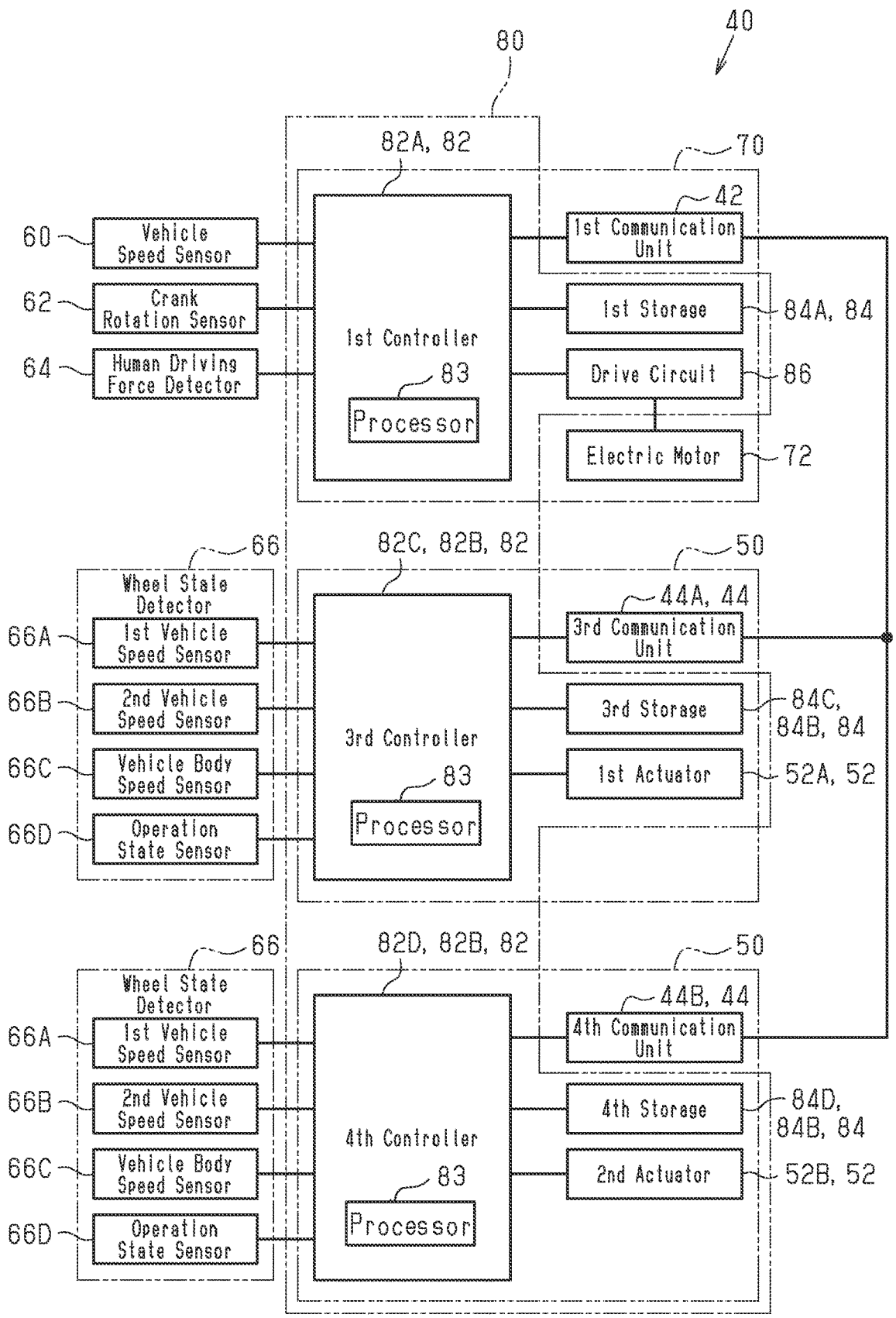
FIG. 11 is a block diagram showing the electrical configuration of a human-powered vehicle including a human-powered vehicle control device and a human-powered vehicle control system in accordance with a first modified example.

As shown in FIG. 11, the electric actuator 52 can include a first actuator 52A corresponding to the first wheel 14A and a second actuator 52B corresponding to the second wheel 14B. In the present modified example, it is preferred that the second controller 82B include a third controller 82C that controls the first actuator 52A and a fourth controller 82D that controls the second actuator 52B. Preferably, the second storage 84B includes third storage 84C that stores information related to control of the first actuator 52A and fourth storage 84D that stores information related to control of the second actuator 52B. Preferably, the second communication unit 44 includes a third communication unit 44A connected to the third controller 82C and a fourth communication unit 44B connected to the fourth controller 82D. In a case where the brake control device 50 is actuated, the electronic controller 82 can drive the first actuator 52A and the second actuator 52B in different drive states. In a case where the brake control device 50 is actuated, the electronic controller 82 can drive only one of the first actuator 52A and the second actuator 52B.

Figure 12:
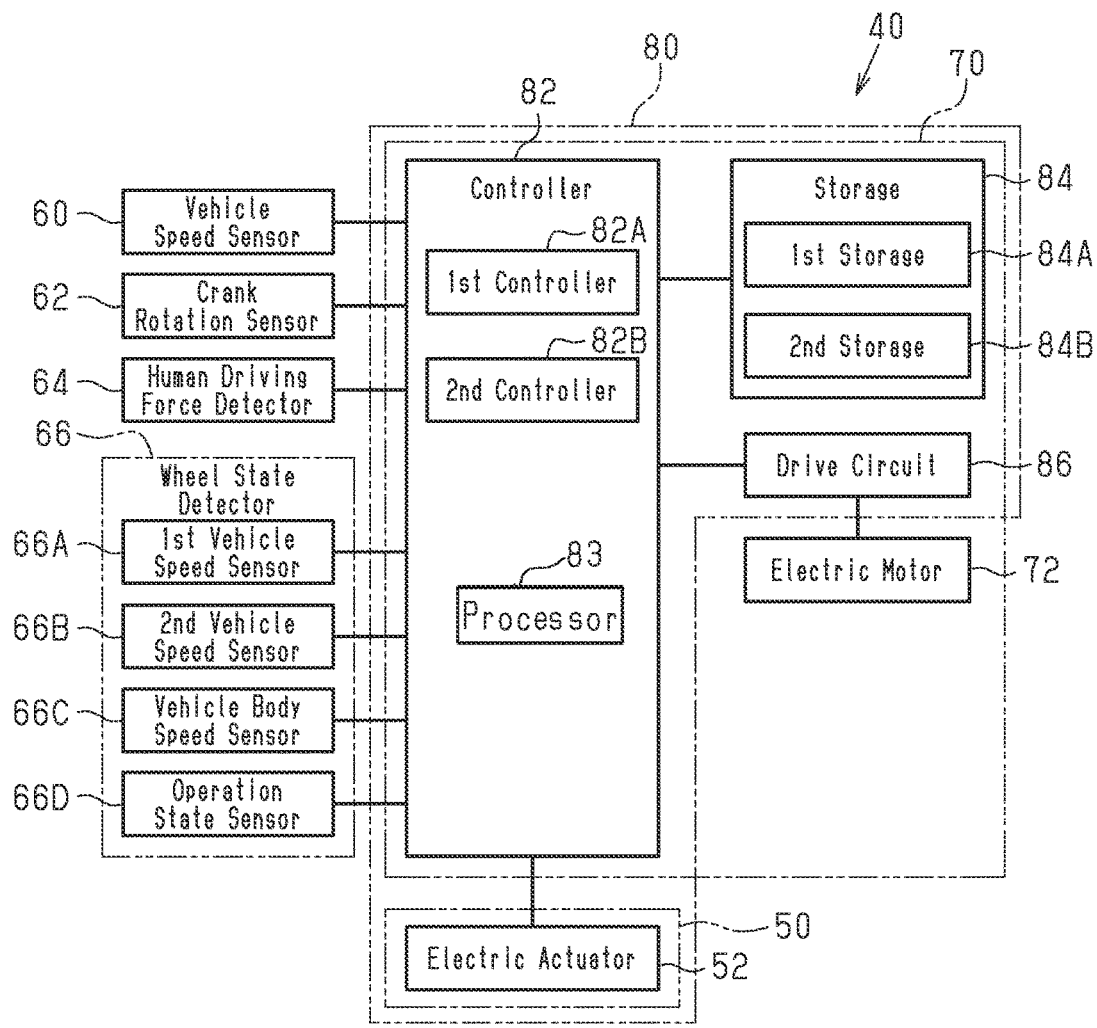
FIG. 12 is a block diagram showing the electrical configuration of a human-powered vehicle including a human-powered vehicle control device and a human-powered vehicle control system in accordance with a second modified example.

As shown in FIG. 12, the first controller 82A can be integrated with the second controller 82B. For example, the first controller 82A and the second controller 82B are provided on the same substrate. For example, the first controller 82A and the second controller 82B are provided at one of the drive unit 70 and the brake control device 50. In this case, the first storage 84A and the second storage 84B can also be integrated with each other. In this case, the first communication unit 42 and the second communication unit 44 can be omitted.

Figure 13:
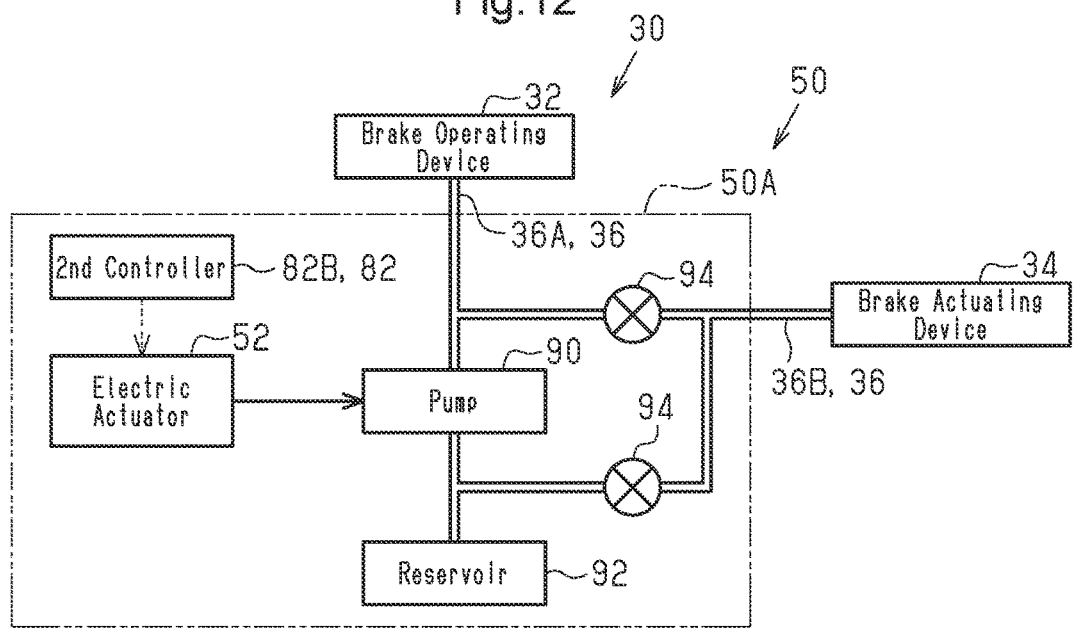
FIG. 13 is a schematic diagram showing the structure of a brake device and a brake control device in accordance with a third modified example.

As shown in FIG. 13, the brake device 30 can use pressure of a fluid to generate brake force, and the brake control device 50 can drive a pump 90 provided in a flow passage of the fluid with the electric actuator 52. For example, the brake control device 50 drives a valve 94 provided in the flow passage to open the flow passage to a reservoir 92 so as to decrease the pressure of the fluid. The pump 90 applies pressure to the fluid.

The brake control device 50 can be provided on the brake actuating device 34 and configured to control actuation of a movable portion of the brake actuating device 34. In this case, the brake device 30 can be an electric brake device 30 or a mechanical electric brake device 30 connected to the brake operating device 32 by a cable.

Instead of or in addition to an anti-lock braking system (ABS), the brake control device 50 can be configured to control the brake force of the brake device 30 if the human-powered vehicle 10 slides sideways.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a human-powered vehicle including a drive unit provided with an electric motor that assists in propulsion of the human-powered vehicle, a brake device that generates brake force, and a brake control device that controls the brake force with an electric actuator differing from the electric motor, the control device comprising:
an electronic controller configured to control the electric motor in accordance with an actuation state of the brake control device.

2. The control device according to claim 1, wherein
the electronic controller is configured to stop driving the electric motor in accordance with the actuation state of the brake control device.

3. The control device according to claim 1, wherein
the electronic controller is configured to change a control state of the electric motor from a first state to a second state in accordance with the actuation state of the brake control device, and
the second state is less in an assist level of the electric motor than the first state.

4. The control device according to claim 3, wherein
the electronic controller is configured to change the control state of the electric motor from the first state to the second state in a case where the brake control device is actuated.

5. The control device according to claim 3, wherein
the electronic controller is configured to change the control state of the electric motor from the first control state to the second control state in a case where the brake control device is actuated before a first period elapses from a point of time at which the brake control device was de-actuated.

6. The control device according to claim 3, wherein
the electronic controller is configured to change the control state of the electric motor from the second state to the first state upon a first condition being satisfied in a case where the control state of the electric motor is the second state.

7. The control device according to claim 1, wherein
the electronic controller is configured to change a control state of the electric motor from a third state to a fourth state in accordance with the actuation state of the brake control device, and
the fourth state is greater in an assist level of the electric motor than the third state.

8. The control device according to claim 7, wherein
the electronic controller is configured to change the control state of the electric motor from the third state to the fourth state in a case where the brake control device is changed from an actuated state to a de-actuated state and a vehicle speed of the human-powered vehicle is greater than or equal to a predetermined vehicle speed.

9. The control device according to claim 1, wherein
the electronic controller is configured to drive the electric motor in a case where a predetermined condition related to a traveling state of the human-powered vehicle is satisfied, and is configured not to drive the electric motor in a case where the brake control device is actuated even in a case where the predetermined condition is satisfied.

10. The control device according to claim 8, wherein:
the electronic controller is configured to change the control state of the electric motor from the third state to the fourth state in a case where the brake control device is changed from an actuated state to a de-actuated state and the vehicle speed of the human-powered vehicle is greater than or equal to the predetermined vehicle speed, and then, the electronic controller is configured to change the control state of the electric motor from the fourth state to the third state in a case where a second condition is satisfied; and
the second condition is satisfied in at least one of a case where a second period elapses and a case where a traveling state of the human-powered vehicle becomes a predetermined state.

11. A control system for a human-powered vehicle, the control system comprising:
the control device according to claim 1;
the drive unit; and
the brake control device.

12. The control system according to claim 11, wherein
the brake device is configured to use pressure of a fluid to generate the brake force, and
the brake control device is configured to drive a valve provided in a flow passage of the fluid with the electric actuator.

13. The control system according to claim 11, wherein
the brake device is configured to use pressure of a fluid to generate the brake force, and
the brake control device is configured to drive a pump provided in a flow passage of the fluid with the electric actuator.

14. The control system according to claim 11, wherein
the brake control device is integrated with the brake device.

15. The control system according to claim 11, wherein
the human-powered vehicle includes a first wheel and a second wheel, and
the electric actuator includes a first actuator corresponding to the first wheel and a second actuator corresponding to the second wheel.

16. The control system according to claim 11, wherein
the electronic controller includes a first controller that controls the electric motor and a second controller that controls the electric actuator,
the first controller is provided at the drive unit,
the second controller is provided at the brake control device,
the human-powered vehicle includes a first wheel and a second wheel,
the electric actuator includes a first actuator corresponding to the first wheel and a second actuator corresponding to the second wheel, and
the second controller includes a third controller configured to control the first actuator and a fourth controller configured to control the second actuator.

17. The control system according to claim 11, wherein
the electronic controller includes a first controller configured to control the electric motor and a second controller that controls the electric actuator,
the first controller is provided at the drive unit, and
the second controller is provided at the brake control device.

18. The control system according to claim 11, wherein
the electronic controller includes a first controller configured to control the electric motor and a second controller configured to control the electric actuator, and
the first controller is integrated with the second controller.

19. The control system according to claim 16, further comprising:
a first communication unit connected to the first controller and provided on the drive unit; and a second communication unit connected to the second controller and provided on the brake control device,
the first communication unit and the second communication unit being connected communicably through wired or wireless communication.

20. The control system according to claim 19, wherein
the first controller is integrated with the first communication unit.

21. The control system according to claim 19, wherein
the second controller is integrated with the second communication unit.

* * * * *